United States Patent
Jeung

[11] Patent Number: 5,873,535
[45] Date of Patent: Feb. 23, 1999

[54] LOCKING MEANS FOR A COVER OF A BAIT CAST REEL IN WHICH A BUTTON IS PRESSED TO UNLOCK THE COVER AND ENABLE ITS SEPARATION

[75] Inventor: Woon Goo Jeung, Inchon, Rep. of Korea

[73] Assignee: Bando Leports Ltd., Inchon, Rep. of Korea

[21] Appl. No.: 858,065

[22] Filed: May 16, 1997

[30] Foreign Application Priority Data

Jun. 11, 1996 [KR] Rep. of Korea .................. 1996-15402

[51] Int. Cl.[6] ................................................. A01K 89/015
[52] U.S. Cl. ......................... 242/314; 242/310; 242/313; 242/318
[58] Field of Search .................................. 242/310, 311, 242/312, 313, 314, 318, 315

[56] References Cited

U.S. PATENT DOCUMENTS

| | | | |
|---|---|---|---|
| 832,291 | 1/1906 | Bryant | 242/313 |
| 4,728,052 | 3/1988 | Yeh | 242/313 |
| 5,127,603 | 7/1992 | Morimoto | 242/313 X |
| 5,370,331 | 12/1994 | Sato | 242/313 |
| 5,372,324 | 12/1994 | Satp | 242/313 |
| 5,377,925 | 1/1995 | Miyuazaki | 242/312 |
| 5,577,680 | 11/1996 | Ikuta | 242/313 |
| 5,601,246 | 2/1997 | Takahashi | 242/310 X |

*Primary Examiner*—Donald P. Walsh
*Assistant Examiner*—Emmanuel M. Marcelo
*Attorney, Agent, or Firm*—Ladas & Parry

[57] ABSTRACT

A cover locking device for a bait cast reel for easily detaching the cover which is assembled at one side of the reel body so as to rotatably receive one end of the spool shaft of a spool on which a fishing line is wound. The cover locking device comprises a first spring located in a first recess formed in the reel body, a locking member received in the first recess and biassed by the first spring to protrude outwardly from the first recess, and a button received in a second recess formed in an outer surface of the cover. A pressing member projects from the button and is inserted in a guide hole to contact the locking member which extends into a third recess in the cover. The guide hole connects the second and third recesses. A stopper on the pressing member prevents the pressing member from escaping from the third recess. When the button is pressed, the locking member is displaced from the third recess to unblock rotation of the cover and enable its unlatching from the reel body.

7 Claims, 4 Drawing Sheets

LOCKING MEANS FOR A COVER OF A BAIT CAST REEL IN WHICH A BUTTON IS PRESSED TO UNLOCK THE COVER AND ENABLE ITS SEPARATION

BACKGROUND OF THE INVENTION

The present invention relates to a cover locking means for a bait cast reel, and more particularly to a cover lock for a bait cast reel for easily detaching the cover which is assembled to one side of the reel body so as to support one end of the spool shaft of a spool on which a fishing line is wound.

Conventionally, a reel for fishing includes a spinning reel using bait, for example a paste bait or an earth worm, and a bait cast reel using artificial bait having the shape of a fish or a worm.

Such a bait cast reel includes, as shown in FIG. 1, a reel body(100), a rotation handle(110) assembled at one side thereof, a spool(120) having a spool shaft(122) one end of which is supported in the reel body(100), a fishing line being wound onto the spool as the rotation handle(110) rotates, and a cover(130) assembled to the reel body(100) to support the other end of the spool shaft(122).

When fishing with this bait cast reel, an artificial bait is put on the fish hook, and thrown into the water, and then the rotation handle is rotated slowly to hook a fish. The fishing line is wound onto the winding portion of the spool(120) such that the artificial bait moves in the winding direction of the fish line, to induce the fishing to take the artificial bait.

Accordingly, the fishing line wound on the spool(120) frequently becomes tangled when the fishing line is wound repeatedly onto the spool(120) after being thrown into the water. Therefore, the cover(130) should be detachable from the reel body(100) to untangle the tangled fishing line.

FIG. 1 also shows a cover locking means for attaching and detaching a cover on the reel body. The cover locking means includes a protrusion(140) extending from one side of the reel body(100), the cover(130) being assembled on the protrusion(140), a locking member(150), a slant face(151) being formed at one end of the locking member so as to be slidable into a groove(131) formed inside the cover(130) when the cover(130) is rotated to assemble the reel body(100) and the cover, the other end of the locking member being supported by a spring(152), and a hook(142) provided in the cover(130) so as to block a further rotation of the cover(130) and prevent the cover(130) from being separated from the reel body(100) when the cover(130) is rotated to be assembled to the reel body(100).

To detach the cover(130) when assembled with the reel body(100), one may grip the reel body(100) with one hand, preferably with the right hand, and push the locking member(150) backward with the thumb, whereby the one end of the locking member(150) is retracted, and thus is unlocked from the groove(131). At the same time, the cover(130) is rotated downwards with the other hand, preferably with the left hand. Therefore, the protrusion(140) is unlocked from the hook(142), whereby the cover(130) can be detached from the reel body(100). However, to detach the cover from the reel body, one has to unlock the locking member while gripping the reel body. After this, it is possible to rotate the cover. However, the is a difficult operation, since one has to do the manipulation for unlocking the locking member located backside of the reel body with one hand while rotating the cover at the same time using the other hand.

SUMMARY OF THE INVENTION

Accordingly, it is an object of the present invention to provide a cover locking means for a bait cast reel for easily attaching and detaching the cover assembled at one side of the reel body.

In accordance with one aspect of the present invention, there is provided a cover locking means for a bait cast reel for attaching and detaching a cover against a reel body of a bait cast reel, wherein the bait cast reel comprises a reel body for rotatably supporting one end of a spool shaft of a spool on which a fishing line is wound, a cover assembled to one side of the reel body to support the other end of the spool shaft of the spool, and a rotation handle for rotating the spool to wind the fishing line onto the spool, which comprises:

a first spring located in a first recess formed in the reel body, a locking member, one end thereof being received in the first recess and supported by the first spring, the other end of the locking member protruding outwardly from the first recess by the elasticity of the first spring, a button having one end received in a second recess formed in an outer surface of the cover, and a pressing member formed on the other end of the button and inserted in a guide hole so as to push the locking member through a third recess formed in a protruding outer surface at the opposite side of the second recess to receive the other end of the locking member, said guide hole connecting the second recess with the third recess, and a stopper to prevent the pressing member of the button from escaping from the third recess, said stopper being provided on the outer surface of the pressing member.

In accordance with another aspect of the present invention axial displacement of the button equals axial displacement of the locking member.

In accordance with still another aspect of the present invention the other end of the locking member which abuts against the protruding outer surface of the cover has a sloped surface such that the locking member is smoothly pushed into the first recess when the cover is rotated against the reel body to assemble the cover to the reel body.

The characteristics of the present invention will be understood more fully from the following detailed description and accompanying drawings showing a preferred embodiment of the invention.

DETAILED DESCRIPTION OF THE INVENTION

Figure 1:
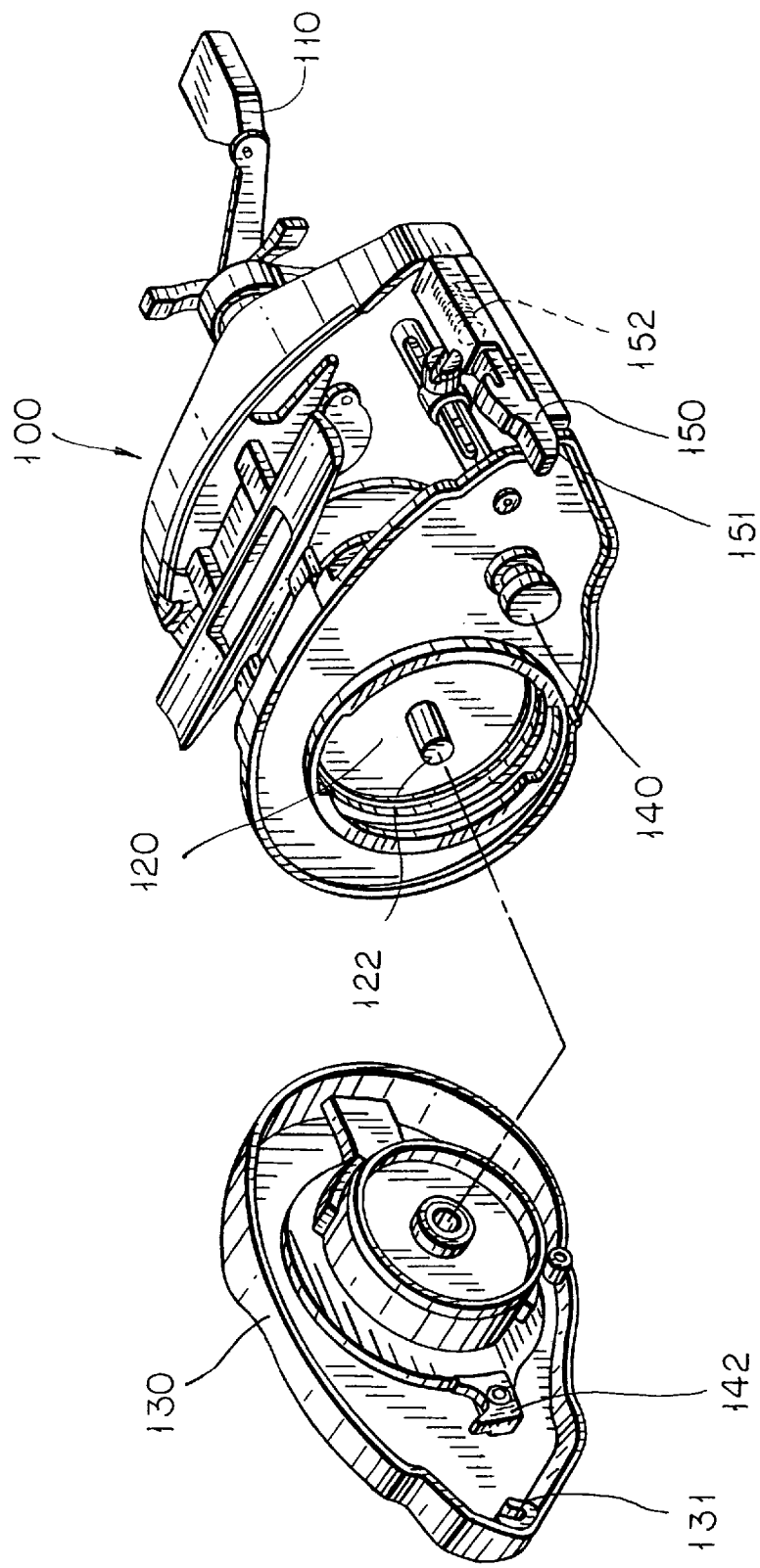
FIG. 1 is a partially exploded perspective view of a conventional cover locking means for a bait cast reel.
Figure 2:
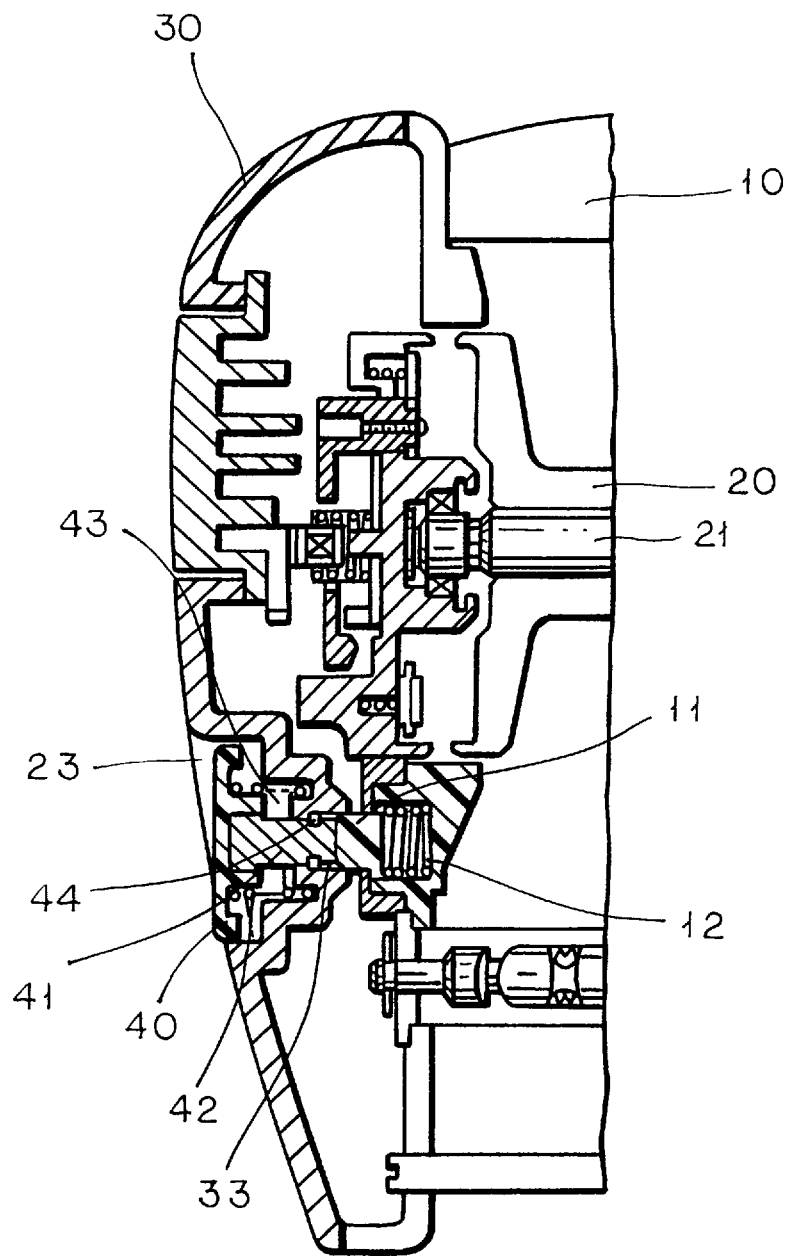
FIG. 2 is a sectional view of a cover locking means for a bait cast reel according to a preferred embodiment of the present invention.
Figure 3:
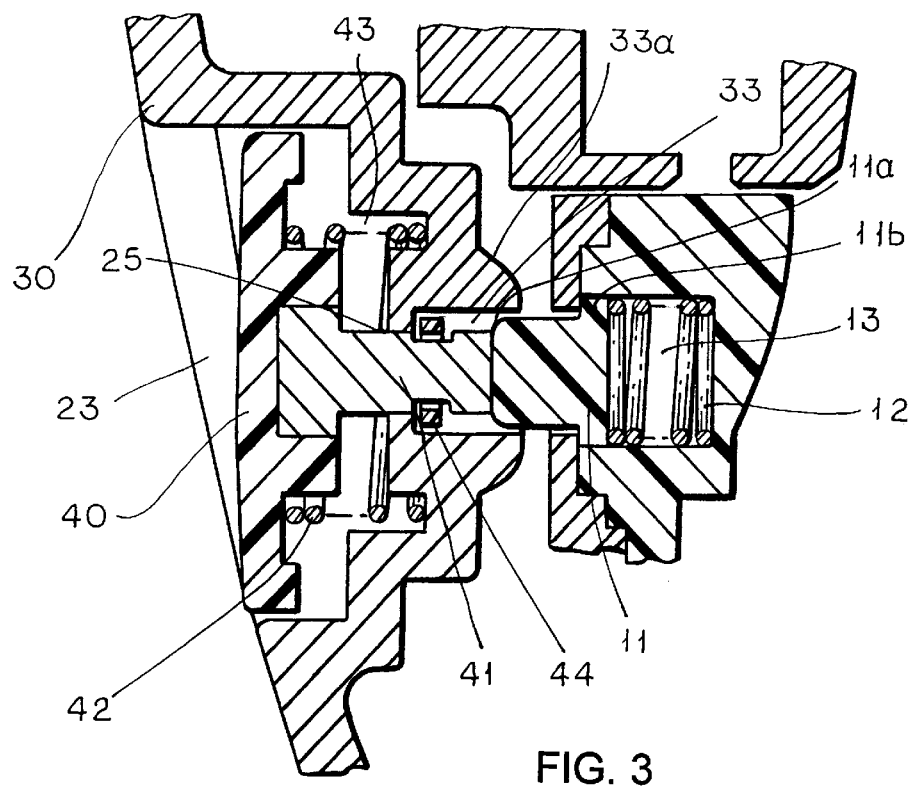
FIG. 3 is an enlarged sectional view of the cover locking means for the bait cast reel according to the preferred embodiment of the present invention, in which the cover locking means is locked with the bait cast reel.

FIG. 2 shows a sectional view of the cover locking means for a bait cast reel according to a preferred embodiment of the present invention. A spool(20) on which a fishing line is wound is disposed in a reel body(10), and a cover(30) is assembled at one end of the reel body(10) to rotatably support one end of a spool shaft(21) of the spool(20). A first recess(13), FIG. 3, is formed in the reel body(10), and a first spring(12) is received in the first recess(13). A locking member(11) is also received in the first recess(13). One end of the locking member(11) is supported on the first spring (12), and the other end of the locking member(11) is urged outwardly from the first recess(13) by the first spring(12). A flange(11b) is formed at said one end of the locking member (11) to prevent the locking member(11) from escaping from the first recess(13). A bevel(11a) is formed at the other end of the locking member(11).

A second recess(23) is formed in the outer surface of the cover(30), and a third recess(33) is formed in the outer surface(33a) of the cover opposite the second recess(23). A guide hole(25) connects the second recess(23) with the third recess(33).

One end of a button(40) is received in the second recess (23), and a pressing member(41) of the button(40) is inserted into the guide hole(25) to push against the locking member (11). A stopper(44) is provided on the outer surface of the pressing member(41) for preventing the pressing member (41) from escaping from the third recess(33). To make the pressing manipulation of the button(40) smooth, a second spring(42) is provided in a fourth recess(43) formed at the bottom of the second recess(23).

The depth of the second recess(23) is such that the displacement of the button(40) corresponds to the displacement of the locking member(11) which is pressed by the pressing member(41) of the button(40) when the button(40) is pressed.

FIG. 3 shows an enlarged sectional view of the cover locking means in a locked condition in which said other end of the locking member(11) is inserted into the third recess (33) by the first spring(12).

Figure 4:
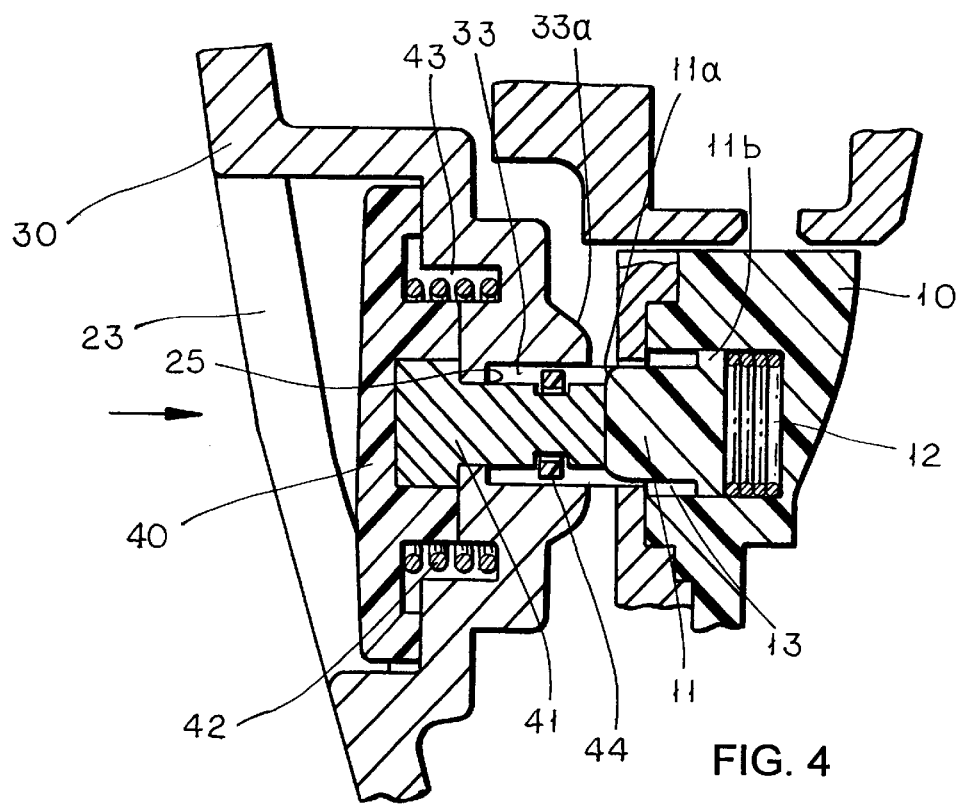
FIG. 4 is an enlarged sectional view of the cover locking means for the bait cast reel according to the preferred embodiment of the present invention, in which the cover locking means is unlocked from the bait cast reel.
Figure 5:
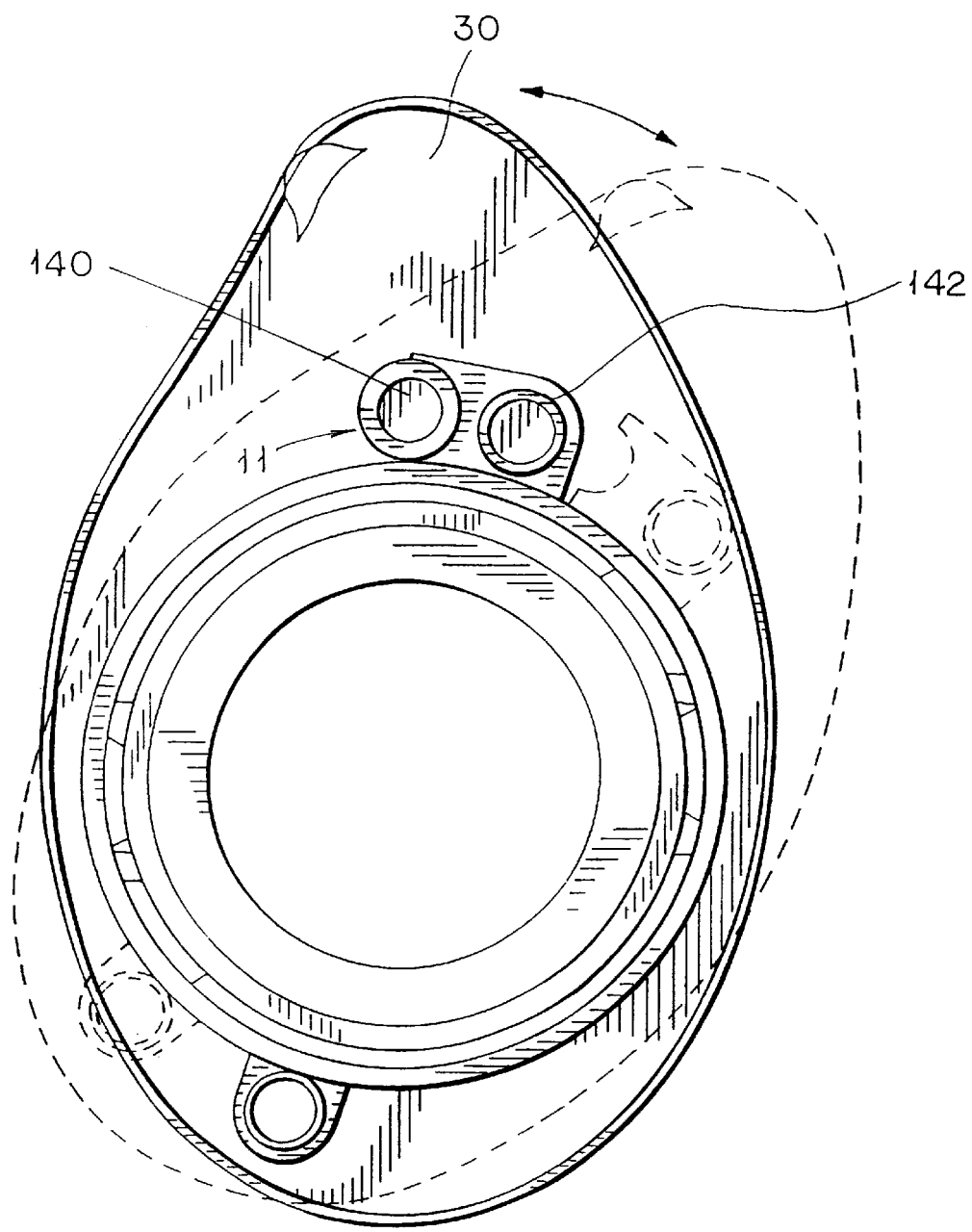
FIG. 5 is a front view of the cover locking means according to the preferred embodiment of the present invention, showing how the cover is opened and closed after the cover locking means is unlocked.

To replace the fishing line, or to untangle a tangled fishing line, first, the cover(30) should be detached from the reel body(10). To detach the cover(30) from the reel body, one grips the reel body(10) with one hand, preferably with the right hand, and pushes the button(40) with a finger, preferably the thumb, of the other hand. Thus, as shown in FIG. 4, pressing member(41) presses against the other end of the locking member(11), whereby the locking member(11) is retracted into the first recess(13) so as to be unlocked from the third recess(33). And then, in this state, the cover(30) may be rotated in the direction designated by an arrow as shown in FIG. 5. Accordingly, hook(142) which is engaged with protrusion(140), as conventional, are unlocked so as to allow the cover(30) to be detached from the reel body(10). The button(40) is returned to its original position by the second spring(42), and the locking member(11) is returned to its original position by the first spring(12).

As described above, because the depth of the second recess(23) is so formed that the displacement of the button (40) equals the displacement of the locking member(11), button(40) when the button(40) is pressed, in case the button(40) is not pressed far enough, the use can perceive that the locking member(11) is not unlocked completely from the third recess(33).

In order to attach the cover(30) a the reel body(10), the cover(30) is rotated in the opposite direction so that for opening the cover(30). Thus, outer surface(33a) is engaged with the bevel(11a) formed on the other end of the locking member. When the cover(30) is rotated to the position in which the hook(142) is hooked with the protrusion(140), the locking member(11) is retracted into the first recess(13) by the first spring, and then inserted into the third recess(33) after being moved forward the first by the first spring(12). Accordingly, the assembling operation of the cover(30) to the reel body(10) is completed.

Therefore, the cover may easily be detached and attached to the reel body by a simple manipulation of the cover locking means according to the present invention.

It is understood that the foregoing description is only illustrative of the invention. Various alternatives and modifications can be devised by those skilled in the art without departing from the invention. Thus, the present invention is intended to cover all such alternatives and modifications which fall within the scope of the appended claims.

What is claimed is:

1. A bait cast reel comprising:

a reel body, a spool onto which a fishing line can be wound, said spool including a spool shaft having one end rotatably supported in said reel body, a cover detachably connected to said reel body, said cover rotatably supporting an opposite end of said spool shaft when said cover is connected to said reel body, a handle connected to the spool for rotating the spool to wind the fishing line onto the spool, and means for locking and unlocking said cover and said reel body comprising:

a first recess in said reel body, a spring in said first recess, a locking member slidably engaged in said first recess and bearing against said spring, said spring acting on said locking member to urge a portion of said locking member out of said first recess, a second recess in an outer surface of said cover, a button slidably engaged in said second recess in a position opposite said locking member when the cover is locked to said reel body, a pressing member secured to said button, a third recess in said cover, said pressing member extending into said third recess and engaging said portion of said locking member, said locking member being urged by said spring into said third recess to lock said cover and said reel body against relative rotation, said cover having a guide hole connecting said second and third recesses, said pressing member being slidably guided in said guide hole, a stopper on an outer surface of said pressing member for preventing escape of said pressing member from said third recess, and hook and projection means between said cover and said reel body for securing said cover and said reel body in a locked condition and permitting separation of said cover from said reel body in an unlocked condition, said cover being unlocked from said reel body to permit separation of the cover from the reel body by pressing said button to displace said locking member by a corresponding amount and move said locking member out of said third recess against the opposition of said spring so that said cover and said reel body are unlocked and are free for relative rotation to unsecure said hook and projection means and permit separation of said cover from said reel body.

2. A bait cast reel as claimed in claim 1, wherein said first, second and third recesses are axially aligned, said button, said pressing member and said locking member being supported in said recesses for common axial movement.

3. A bait cast reel as claimed in claim 2, wherein said guide hole is axially aligned with said second and third recesses.

4. A bait cast reel as claimed in claim 2, wherein said locking member is displaced by said pressing member, when said button is pressed, by a distance equal to the displacement of said button.

5. A bait cast reel as claimed in claim 2, wherein said locking member has an outer end facing said third recess for entering said third recess when the cover and the reel body are locked against rotation, said outer end of the locking member being beveled.

6. A bait cast reel as claimed in claim 1, wherein said button is recessed in said second recess within the outer surface of said cover.

7. A bait cast reel as claimed in claim 1, wherein said pressing member is fixed to said button and extends axially therefrom in longitudinal alignment with said locking member.

* * * * *